US010966368B2

(12) United States Patent
Desai et al.

(10) Patent No.: US 10,966,368 B2
(45) Date of Patent: Apr. 6, 2021

(54) CUTTER HOUSING ASSEMBLY FOR A LAWNMOWER AND LAWNMOWER HAVING SAME

(71) Applicant: Honda Motor Co., Ltd., Tokyo (JP)

(72) Inventors: Shivang Desai, Carrboro, NC (US); Christopher Todd Walker, Hillsborough, NC (US); Teegan L. Kelly, Burlington, NC (US); Robert A. Recher, Mebane, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 32 days.

(21) Appl. No.: 16/281,074

(22) Filed: Feb. 20, 2019

(65) Prior Publication Data

US 2020/0260642 A1    Aug. 20, 2020

(51) Int. Cl.
| | | |
|---|---|---|
| *A01D 34/71* | (2006.01) | |
| *A01D 34/78* | (2006.01) | |
| *A01D 34/54* | (2006.01) | |
| *A01D 42/00* | (2006.01) | |
| *A01D 34/66* | (2006.01) | |
| *A01D 34/81* | (2006.01) | |
| *A01D 34/00* | (2006.01) | |

(52) U.S. Cl.
CPC .......... *A01D 34/71* (2013.01); *A01D 34/005* (2013.01); *A01D 34/54* (2013.01); *A01D 34/667* (2013.01); *A01D 34/78* (2013.01); *A01D 34/81* (2013.01); *A01D 42/005* (2013.01)

(58) Field of Classification Search
CPC ...... A01D 36/667; A01D 34/71; A01D 34/81; A01D 42/005; A01D 34/005; A01D 34/667
See application file for complete search history.

(56) References Cited

U.S. PATENT DOCUMENTS

| | | | | |
|---|---|---|---|---|
| 5,465,564 | A | * | 11/1995 | Koehn ................. A01D 34/005 56/13.6 |
| 5,628,171 | A | * | 5/1997 | Stewart ................ A01D 42/005 56/320.2 |
| 5,845,475 | A | * | 12/1998 | Busboom ............. A01D 34/005 56/320.1 |
| 6,609,358 | B1 | | 8/2003 | Schmidt et al. |
| 6,862,875 | B2 | * | 3/2005 | Iida ........................ A01D 34/71 56/320.2 |
| 6,874,309 | B1 | * | 4/2005 | Bellis, Jr. ............. A01D 42/005 56/320.2 |
| 7,174,700 | B2 | | 2/2007 | Chenevert et al. |
| 7,406,817 | B2 | | 8/2008 | Bledsoe |
| 7,594,379 | B2 | | 9/2009 | Nicholson et al. |
| 7,735,306 | B2 | | 6/2010 | Kure et al. |

(Continued)

*Primary Examiner* — Thomas B Will
*Assistant Examiner* — Madeline Ivy Runco
(74) *Attorney, Agent, or Firm* — Kenealy Vaidya LLP

(57) ABSTRACT

The disclosed subject matter is directed to a lawnmower that can include a cutter housing with a first chamber wall defining a first cutting chamber. A first discharge opening can be located in the chamber wall, and the cutter housing can include a slot arrangement. A conversion assembly can include an adjustable wall slidably attached to the cutter housing so as to be selectively movable within the slot arrangement between an opened position and a closed position to place the lawnmower in either a discharge mode or a mulch mode (or somewhere in between).

20 Claims, 9 Drawing Sheets

(56) References Cited

U.S. PATENT DOCUMENTS

| | | | |
|---|---|---|---|
| 7,823,373 B1 | 11/2010 | Loxterkamp et al. | |
| 7,866,135 B2 * | 1/2011 | Davis | A01D 34/71 56/320.2 |
| 8,387,205 B2 * | 3/2013 | Weihl | A01D 42/06 15/347 |
| 9,485,911 B2 | 11/2016 | Thorman et al. | |
| 9,510,516 B2 * | 12/2016 | Shumaker | B08B 5/02 |
| 9,750,179 B2 | 9/2017 | Korthals et al. | |
| 2003/0154705 A1 * | 8/2003 | Sugden | A01D 34/005 56/320.1 |
| 2004/0255567 A1 * | 12/2004 | Kallevig | A01D 34/005 56/320.2 |
| 2005/0268588 A1 | 12/2005 | Winter et al. | |
| 2007/0261380 A1 * | 11/2007 | Bledsoe | A01D 34/005 56/320.2 |
| 2008/0000211 A1 * | 1/2008 | Hafendorfer | A01D 34/82 56/320.2 |
| 2009/0249764 A1 * | 10/2009 | Butler | A01D 34/005 56/320.1 |

\* cited by examiner

CUTTER HOUSING ASSEMBLY FOR A LAWNMOWER AND LAWNMOWER HAVING SAME

BACKGROUND

Lawnmowers can be configured as garden tractors, riding mowers, and walk-behind mowers. Some walk-behind mowers can include a prime mover mounted to the deck of the lawnmower. Mower decks associated with garden tractors, riding mowers and other walk-behind mowers can be removably attached to the frame of these self-propelled machines. More than one blade can be mounted in the cutting chamber of the deck for any of these embodiments of a lawnmower.

Lawnmowers can be configured to either mulch clippings, which are generated as mowing is performed, or to discharge the clippings through a discharge chute or a discharge opening. Mulching mowers cut the clippings into fine particles and blow the clippings back into the lawn. Discharge mowers can either discharge the clippings directly onto the lawn surface or into a bag that is attached to the lawnmower. The clippings can then be disposed of elsewhere. Some lawnmowers can be converted between mulching lawnmowers and discharge lawnmowers by inserting or removing a removable conversion assembly within the cutter housing and/or the discharge chute such that the operator of the lawnmower removes or installs the removable assembly in order to place the lawnmower in the discharge mode and the mulching mode, respectively. Instead of a removable conversion assembly, some lawnmowers have a movable mulching assembly that remains mounted within the cutter housing and/or the discharge chute and is movable by the operator of the lawnmower between a mulching position and a discharging position within the cutter housing. Some mulching systems are variable mulching systems in which one or more movable components can be moved into any one of a plurality of positions between the mulching position and the discharging position such that some of the clippings are mulched and some of the clippings are directly discharged without mulching, via the discharge chute, into a collection bag or onto the ground.

SUMMARY

In accordance with an aspect of the disclosed subject matter, a cutter housing assembly for a lawnmower can include a cutter housing having a first cutting chamber with a first chamber wall including a first discharge opening. A slot arrangement can be located in the cutter housing. A conversion assembly can include an adjustable wall slidably attached to the cutter housing so as to be selectively vertically movable, within the slot arrangement, between (a) an opened position in which the adjustable wall is positioned so that the first discharge opening is opened to provide a discharge mode, and (b) a closed position in which the adjustable wall is positioned so that the adjustable wall closes the first discharge opening to provide a mulch mode. A height adjustment actuator can be located on the cutter housing and operatively engaged with the adjustable wall. The height adjustment actuator can be controllable by a user for moving the adjustable wall between the opened position and the closed position.

In accordance with another aspect of the disclosed subject matter, a cutter housing assembly for a lawnmower can include a cutter housing having a first cutting chamber with a first chamber wall including a first discharge opening. A second cutting chamber can be provided with a second chamber wall that includes a second discharge opening. A slot arrangement can be provided in the cutter housing. A conversion assembly can include an adjustable wall slidably attached to the cutter housing so as to be selectively vertically movable, within the slot arrangement between (a) an opened position in which the adjustable wall is positioned so that the first discharge opening is opened to provide a discharge mode, and (b) a closed position in which the first adjustable wall is positioned to close the first discharge opening to provide a mulch mode. A second adjustable wall can be slidably attached to the cutter housing so as to be selectively vertically movable, within the slot arrangement, between (a) an opened position in which the second adjustable wall is positioned so that the second discharge opening is opened, and (b) a closed position in which the second adjustable wall is positioned to close the second discharge opening. A height adjustment actuator can be located on the cutter housing and operatively engaged with the adjustable wall, and the height adjustment actuator can be controllable by a user for moving the adjustable wall between the opened position and the closed position. A lift assembly can be attached to the cutter housing and attached to the adjustable wall, and configured to provide an upward bias force to the adjustable wall. A guide assembly can include at least one bracket that guides the adjustable wall moving between the opened position and the closed position.

In accordance with another aspect of the disclosed subject matter, a lawnmower can include a cutter housing with a first chamber wall defining a first cutting chamber, and a first discharge opening, the cutter housing including a slot arrangement. A conversion assembly can include an adjustable wall slidably attached to the cutter housing so as to be selectively movable, within the slot arrangement between (a) an opened position in which the adjustable wall is positioned so that the first discharge opening is opened to provide a discharge mode, and (b) a closed position in which the adjustable wall assembly is positioned so that the adjustable wall closes the first discharge opening to provide a mulch mode. A height adjustment actuator can be located on the cutter housing and operatively engaged with the adjustable wall, and the height adjustment actuator controllable by a user to move the adjustable wall between the opened position and the closed position.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
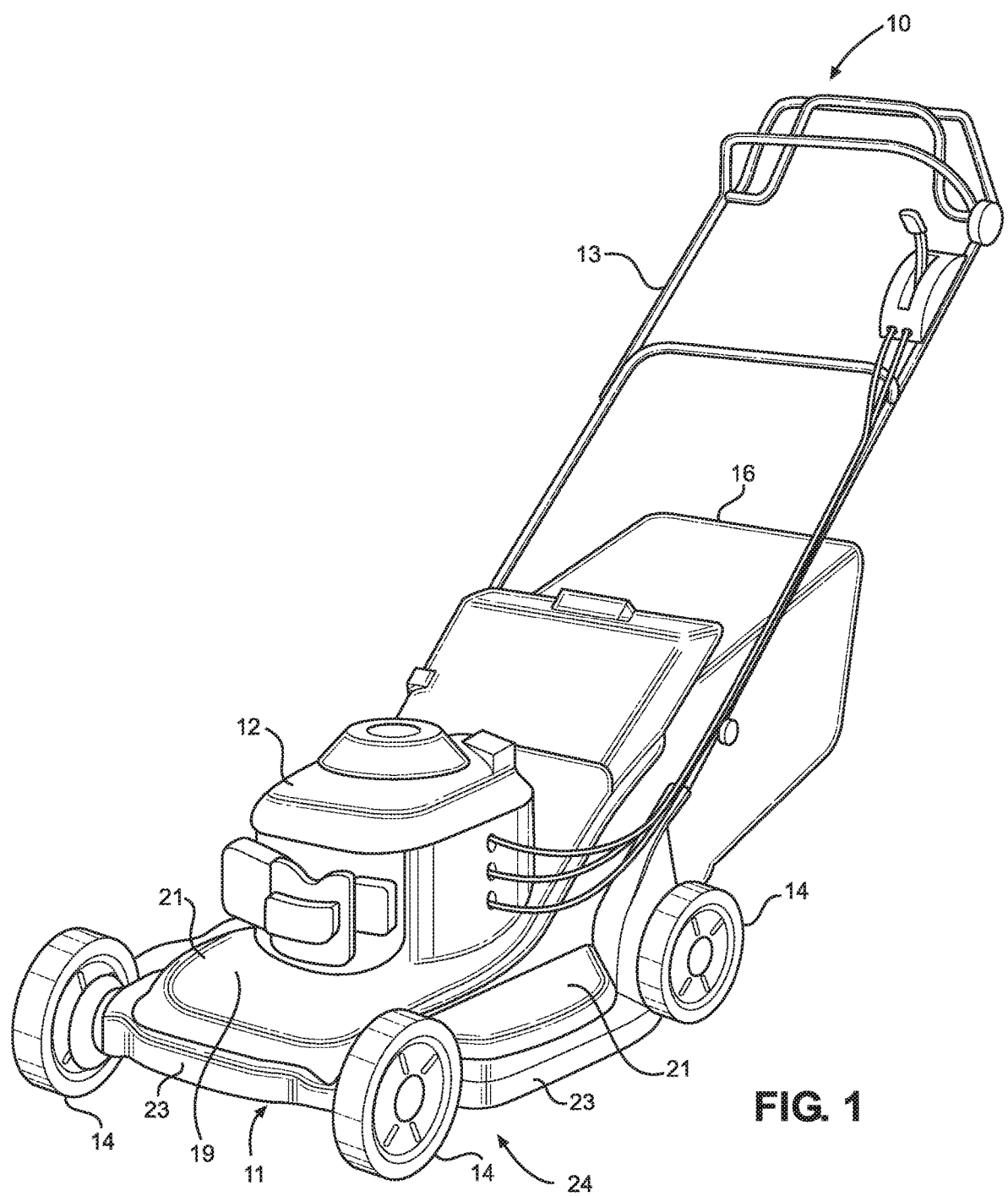
FIG. 1 is a perspective view of an embodiment of a lawnmower made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Mulching assemblies are known that convert a lawnmower between a "discharge" mode and a "mulch" mode. A mulch mode can be desired in that cut vegetation can be returned to the ground to work as a fertilizer and to avoid the necessity of bagging the clippings. Such lawnmowers can include a discharge opening either on the side of the cutter housing or through a back opening in the cutter housing. Some mulching assemblies are permanent and remain mounted in the cutter housing of the lawnmower. Such mulching assemblies can include many components including different mulch baffles, mulch doors, levers, and rotating gears that allow conversion from a full mulching mode to a discharge mode. However, these many components can result in a labor-intensive assembly for manufacturing and for operation and maintenance, and often do not work efficiently and require a great deal of maintenance and repairs. Thus, the operating and manufacturing cost can increase as compared to a lawnmower that includes a removable conversion assembly. With regard to removable mulch conversion assemblies, the user may need to manually attach baffles or other structure in order to switch between mulching and discharge modes. However, this can require hard work and can be time-consuming. If the user needs to manually attach a conversion assembly, the operator can perceive the removal and installation processes of the removable conversion assembly as inconvenient and time consuming. Thus, there is a need for a mulching assembly that can reduce manufacturing and operating cost and lessen or avoid any inconvenience perceived by the operator when converting the lawnmower between the discharge mode and the mulching mode.

In accordance with one or more embodiments, a mower can have a plurality of blade housing walls some of which is/are adjustable wall(s) that cooperate with the blade housing walls to define chambers for the cutting blades. The chambers can be adjusted from a discharge mode to a mulching mode by vertically moving the adjustable walls with respect to the mower deck (into and out of the cutting chamber area of the blade housing).

The adjustable walls can be formed as one or more doors, baffles or gates that can be lowered into the cutting chamber into a mulch mode position, or positioned in a raised position for discharge mode. The adjustable wall assembly can also be positioned in an interim position for a partial mulch/partial discharge mode.

The adjustable wall assembly can be part of a conversion assembly in which the adjustable wall assembly is slidably inserted, hinged or supported on one or more vertical guides or towers with a respective spring and driving mechanism. Of course, the spring can be replaced with other known biasing devices (e.g., bands, dampers, etc.) or automated movement devices or structures (e.g., stepper motors, direct drives, etc.). The adjustable wall assembly, which can include the multiple adjustable chamber walls, can be moved vertically up and down and can be operated by a height adjustment actuator, such as an electric motor with a rack and pinion gear configuration. A user or operator of the lawnmower can operate the up and down movement of the adjustable wall assembly while the operator remains seated on the lawnmower. Such operation can be performed through a controller or regulator on a control panel of the lawnmower (or via a lever for manual or hydraulic power source, or other known structure). The controller can be operatively attached to the electric motor, of the conversion assembly, through suitable control and/or power wires. During operation of the conversion assembly, the adjustable wall assembly can move vertically down to close space between blades within the cutter housing (under the mower/cutter deck). The adjustable wall assembly can partially or fully close space between cutting chambers so as to provide partial mulch to full mulch mode. When in full discharge mode, the adjustable chamber walls, of the adjustable wall assembly, can be raised such that a lower edge is flush with a bottom surface of the cutter deck. The adjustable wall assembly can be operated by motors as described below. When the adjustable wall assembly is fully lowered, in full mulch mode, the adjustable wall assembly can be supported by guide slots and by the force of springs in tension.

The disclosed mower allows the user to change cutting mode from an all mulching mode to side or rear discharge mode without the need of installing extra parts. This action can be done from the operator's seat via a switch that controls the conversion assembly.

Figure 2:
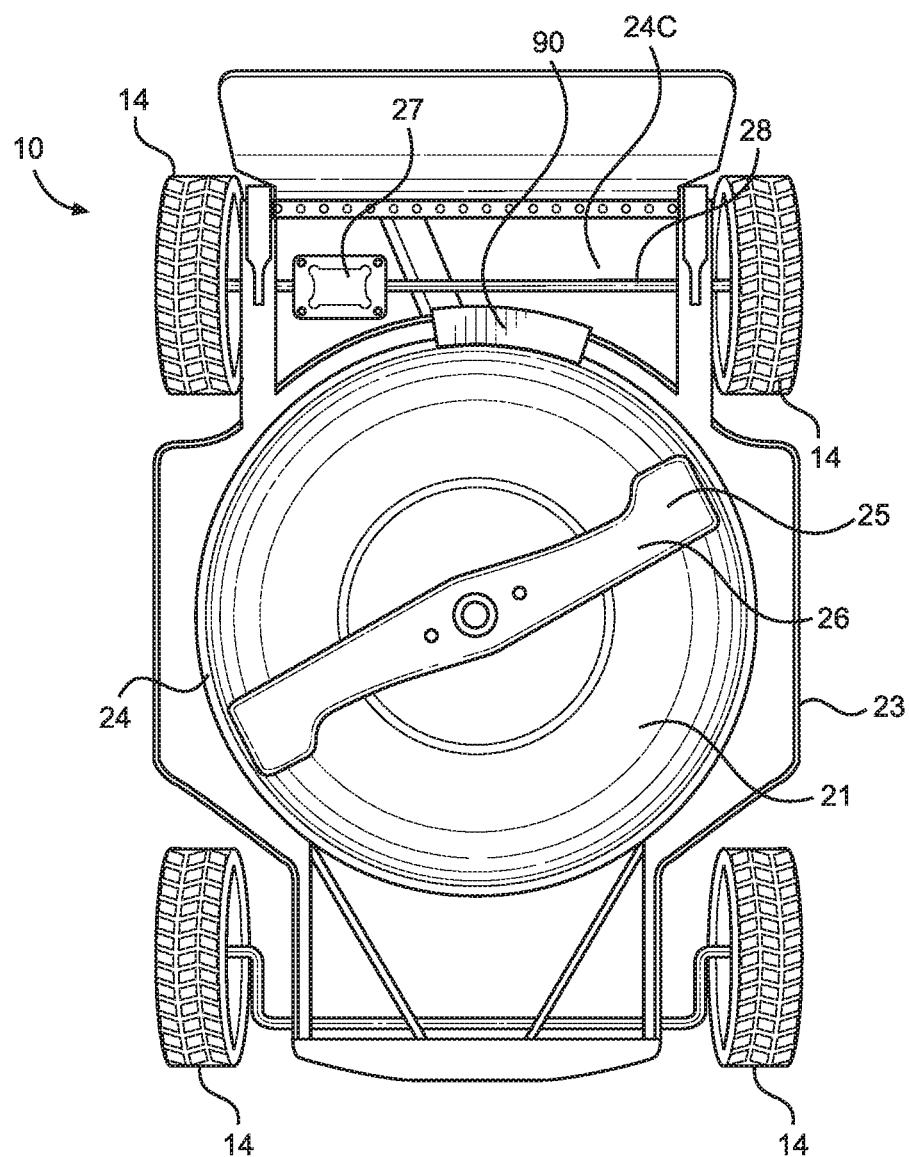
FIG. 2 is a bottom view of the lawnmower of FIG. 1.

FIG. 1 is a perspective view of an exemplary lawnmower 10, and specifically a walk-behind lawnmower made in accordance with principles of the present disclosure. FIG. 2 is a bottom view of the lawnmower of FIG. 1. The lawnmower 10 can include a cutter housing assembly that includes a cutter housing 11 (also referred to as a deck, a mower deck, or as a cutter deck). A prime mover 12 can be attached to the cutter housing 11. The prime mover 12 can be in the form of or include an internal combustion engine or an electric motor, for example. The prime mover 12 can be attached to a mounting portion 19 of the cutter housing 11 using an engine mount, bosses, mechanical fasteners, and/or other mechanical devices. The mounting portion 19 of the exemplary embodiment of FIG. 1 can surround an opening at a central portion of the cutter housing 11, and can include a plurality of mounting holes spaced around the opening. The prime mover 12 can drive a driveshaft that supports at least one blade. As shown in FIG. 2, the blade(s) 25 can rotate in a cutting chamber 24 defined by the cutter housing 11 and opened toward the ground. In operation of the lawnmower, the prime mover 12 rotates the driveshaft, which, in turn, rotates the blade. As a result, the lawnmower 10 can perform a mowing operation on vegetation, such mowing a lawn.

The lawnmower 10 can include a steering handle 13 and a plurality of wheels 14. The steering handle 13 can be used by a user to operate the lawnmower 10 and guide the path of travel of the lawnmower 10. The steering handle 13 can include or be associated with various control mechanisms. Such control mechanisms can include speed controls for self-propelled lawnmowers and safety stop levers or bars, which the user depresses or holds to maintain the lawnmower in a running state. The wheels 14 of the lawnmower 10 can be of various shapes and sizes as desired. In a self-propelled lawnmower, the wheels 14 of the lawnmower 10 can be driven so as to propel the lawnmower 10.

The lawnmower 10 can also include a discharge chute 24c and a collection bag 16. The discharge chute 24c can be located at the rear of the cutter housing 11 and adjacent to the wheel 14 at the right rear of the cutter housing 11, for example. The discharge chute 24c can be oriented to discharge the vegetation clippings toward the side of the lawnmower 10 or toward the rear of the lawnmower 10. In the exemplary embodiment of FIGS. 1 and 2, the discharge chute 24c can discharge the clippings toward the rear of the lawnmower 10. When the lawnmower 10 is in a discharging mode, lawn clippings, for example, can be propelled from the cutting chamber 24, in which blade(s) 25 spins and in which vegetation is cut by the spinning blade(s), of the lawnmower 10 into the discharge opening and through the discharge chute 24c. The clippings can pass through the discharge chute 24c and into the collection bag 16. Once the collection bag 16 is filled with lawn clippings, or at any other time, the collection bag 16 can be emptied. An adjustable wall assembly 90 can be located adjacent the chute 24c to selectively block and open the cutting chamber access to the chute 24c. The adjustable wall assembly 90 can move vertically up and down relative to the mower deck by means of a motor located adjacent the mower deck that is controlled by the operator. When the adjustable wall assembly 90 is lifted up, the clippings can pass through the chute 24c to the collection bag 16. When the adjustable wall assembly 90 is lowered, the adjustable wall assembly 90 combines with the permanent inner wall of the cutting chamber 24 to form a continuous cylindrical or ellipsoid surface to form a mulching mode in which the clippings are clipped and drop to the ground. Alternatively, the collection bag 16 can be removed from the lawnmower 10, and the lawnmower 10 can discharge the clippings through the discharge chute 24c and onto the ground when the adjustable wall assembly 90 is in the raised position. The lawnmower 10 can include gearbox 27 connected to the prime mover 12 so as to drive the rear axle 28 and wheels 14. The gearbox 27 can be coupled to the prime mover 12 directly, or by a gear linkage, belt drive, cam device, or other known drive connection so as to provide power to the rear axle 28.

As shown in FIG. 1 and FIG. 2, the cutter housing 11 can include a top wall 21 and one or more sidewalls 23 that extend downward from the top wall 21 and toward the ground. The top wall 21 can be demarcated from the sidewalls 23 by the top wall 21 having a substantially horizontal disposition and the sidewall(s) 23 having a substantially vertical disposition. The top wall 21 can be demarcated from the sidewall(s) 23 by being constructed of respective parts and/or being separated by a particular feature of the lawnmower, such as a distinct bend or ridge. The top wall 21 can also be integrally formed with the sidewall(s) 23. For example, the top wall 21 and the sidewall(s) 23 can be integrally formed of stamped or cast metal or of molded plastic construction. In the exemplary embodiment of FIG. 1, the cutter housing 11 can be stamped from a steel sheet.

Figure 3:
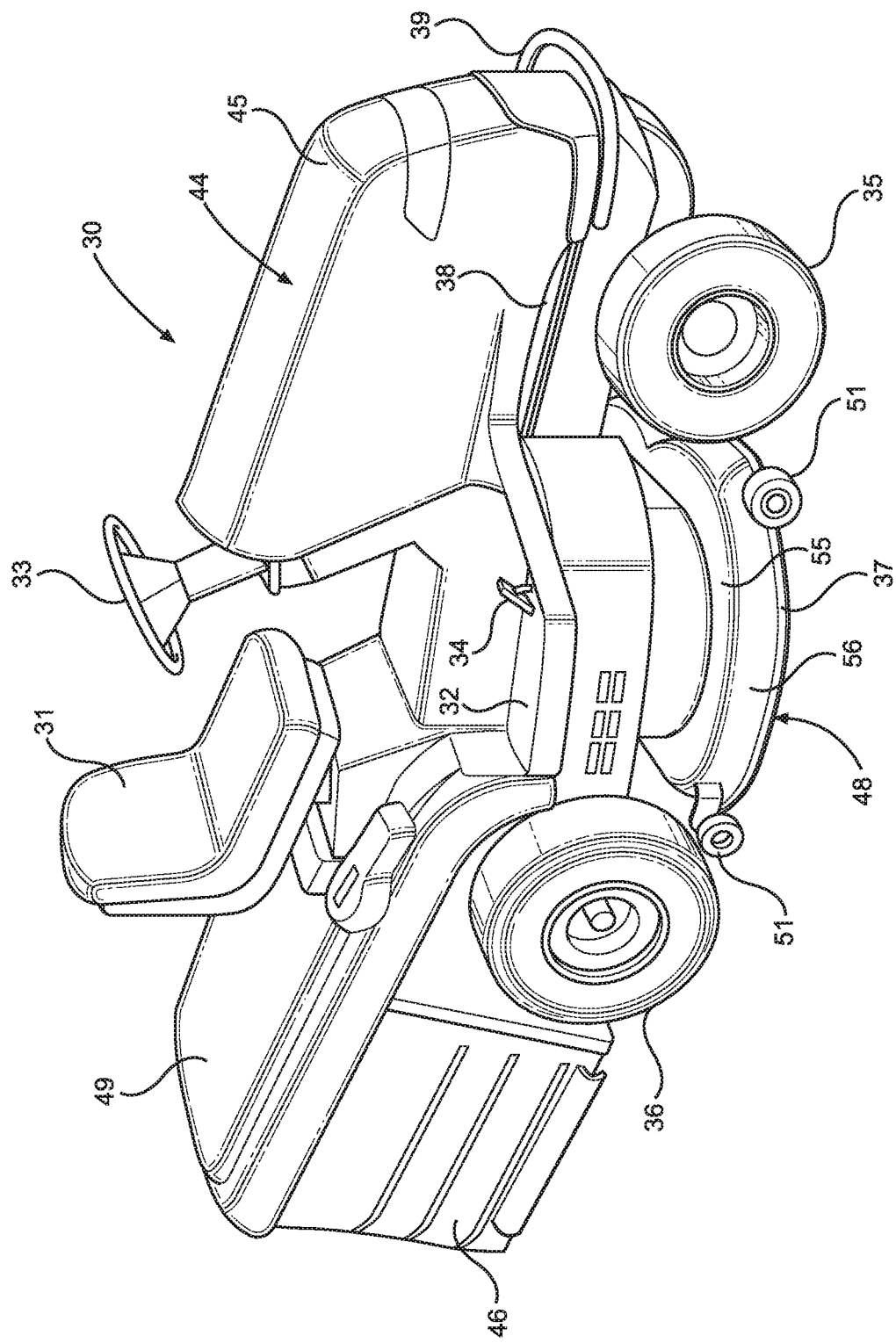
FIG. 3 is a perspective view of another embodiment of a lawnmower made in accordance with principles of the disclosed subject matter.

FIG. 3 is a perspective view of another embodiment of a lawnmower 30 made in accordance with principles of the disclosure. The lawnmower 30 can be in the form of a riding lawnmower or a garden tractor on which a human operator rides. The operator can be supported by a seat 31 and one or more foot supports 32 of the lawnmower.

Control of movement of the lawnmower 30, by the operator, can be accomplished by use of a steering wheel or other steering mechanism 33, one or more control pedals 34, and other control mechanisms. The steering wheel 33 can control turning of the front wheels 35 of the lawnmower 30 via known mechanical linkage systems, such as rack and pinion mechanisms, etc. Accordingly, the operator can manipulate the steering wheel 33 to guide or control a path of travel of the lawnmower 30. The one or more control pedals 34 can be provided on or adjacent to the foot supports 32 of the lawnmower 30. For example, a control pedal 34 can be provided to control travel speed of the lawnmower 30 and/or whether the lawnmower 30 moves in a forward direction or reverse direction.

Figure 4:
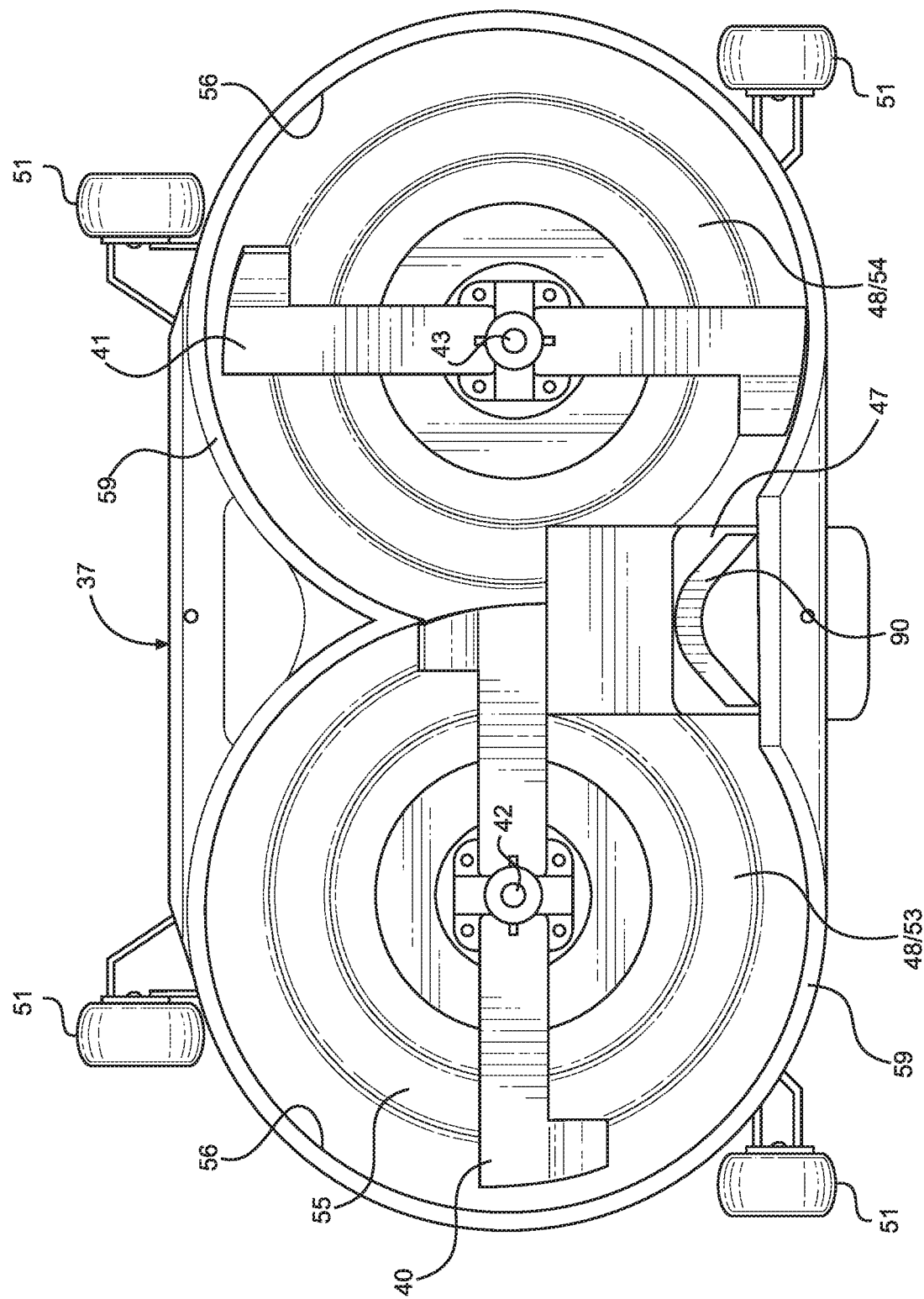
FIG. 4 is a bottom view of the lawnmower of FIG. 3.

The lawnmower 30 can include front wheels 35 and rear wheels 36 each respectively located on opposite corners of a cutter housing 37 (also referred to as a deck, mower deck, or as a cutter deck). The cutter housing 37 can support one or more blades 40, 41 as shown in FIG. 4. The blade(s) can rotate in a cutting chamber 48 defined by the cutter housing 37 and the chamber 48 can be opened toward the ground. In operation of the lawnmower 30, the prime mover 38 can be connected to the one or more blades 40, 41 by first driven shaft 42 and second driven shaft 43 so as to rotate the one or more blades. As a result, the lawnmower 30 can perform a mowing operation on vegetation, such as a lawn. The prime mover 38 can be in the form of an internal combustion engine (using gasoline, propane, etc.) or an electric motor to provide power to the one or more wheels 35, 36 of the lawnmower. For example, the prime mover 38 can power the two rear wheels 36 of the lawnmower such that the two rear wheels 36 are the powered wheels.

The lawnmower 30 can include a frame or chassis 39. The frame 39 can provide a main supporting structure for the lawnmower 30 to which various components of the lawnmower 30 are attached.

The frame of the lawnmower can support a body 44 of the lawnmower 30. The body 44 can provide an outer, finished surface that can cover the frame 39, prime mover 38, and other components of the lawnmower 30. The body 44 can also include an engine hood 45 that covers at least a portion of the prime mover 38.

The lawnmower 30 can also include a collection bag 46 supported by the frame 39 of the lawnmower. The collection bag 46 can be supported by rods or other structural supports that extend rearwardly from a portion of the frame 39 above or adjacent to the rear wheels 36. A discharge opening and/or passageway 47 can be provided to transfer clippings from a cutting chamber 48 to the collection bag 46 when the lawnmower 30 is in a discharge mode. A collection bag cover 49 can be positioned over and/or cover the collection bag 46. An adjustable wall assembly 90 can be located adjacent the passageway 47 to selectively block and open the cutting chamber access to the passageway 47. The adjustable wall assembly 90 can move vertically up and down relative to the mower deck (substantially parallel to the rotational axes of the blades 40, 41) by means of a motor located adjacent the mower deck that is controlled by the operator. When the adjustable wall assembly 90 is lifted up, the clippings can pass through the passageway 47 to the collection bag 46. When the adjustable wall assembly 90 is lowered, a permanent wall, such as the sidewall 56, and the lowered adjustable wall 90 combine to form a closed chamber to place the lawnmower in a mulching mode such that the clippings are clipped and drop to the ground after circulating within the closed chamber. Alternatively, the collection bag 46 can be removed from the lawnmower 30 and clippings can be discharged through the discharge passageway 47 and onto the ground when the adjustable wall assembly 90 is in the raised position.

A lift assembly, i.e. a cutter housing lift assembly, can be provided to control the height of the cutter housing 37 with respect to the frame 39 and/or wheels. The height of the cutter housing 37 can be controlled so as to be positioned between a raised position and a lowered position. In the raised position, the cutter housing 37 with blades can be positioned so as to provide a "long cut" to a lawn. In the lowered position, the cutter housing 37 with blades can be positioned so as to provide a "short cut" to the lawn. Various interim positions, between the raised position and the lowered position, can be provided. The height of the cutter housing 37 can be controlled by the human operator riding on the lawnmower 30, such as by a lever mechanism or other control mechanism.

The cutter housing 37 can be provided with housing wheels or housing rollers 51 located at front and rear corners of the cutter housing 37. The housing rollers 51 can limit a distance from the cutter housing 37 to the lawn. Illustratively, if the lawnmower passes over a bump or high point in a lawn, the housing wheel(s) 51 can engage the bump so as to prevent "scalping" of the lawn and/or so as to prevent the blades of the lawnmower 30 from engaging with the earth of the lawn. The particular position and number of the housing rollers or housing wheels 51 can be varied as desired.

FIG. 4 is a bottom view of the cutter housing 37 shown in FIG. 3. The cutter housing 37 or mower deck can include a first cutting chamber 53 and a second cutting chamber 54. In other arrangements, additional cutting chambers can be provided. The first cutting chamber 53 houses a first blade 40. The second cutting chamber 54 houses a second blade 41.

FIG. 4 illustrates a synchronous cutter housing layout. In a synchronous cutter housing layout, rotation of the first blade 40 is synchronized with rotation of the second blade 41. This synchronization of the two cutting blades 40, 41 can be performed by mechanically connecting the first blade 40 to the second blade 41, such as by utilizing a "timing belt" or "synchronous belt" or other similar arrangement. In the illustrated synchronous cutter housing layout, the inner rotational path of an outer edge of the first blade 40 will overlap the inner rotational path of an outer edge of the second blade 41, so as to provide "crossover" of the two blades 40, 41. Accordingly, synchronizing rotation of the first blade 40 with rotation of the second blade 41 prevents the two blades from colliding or interfering with each other during operation. Such "crossover" of the two blades 40, 41 can be desired so as to provide effective cutting coverage of the lawn. In other words, such crossover of the two blades 40, 41 can be desired so that the lawn is effectively cut between the blades, i.e., such that no portion of lawn or grass is missed between the two blades 40, 41.

As shown in FIG. 4, the cutter housing 37 includes a top wall 55 and one or more sidewalls 56 that extend downward from the top wall 55 and toward the ground. The top wall 55 can be demarcated from the sidewall(s) 56 by the top wall 55 having a substantially horizontal disposition and the sidewalls 56 having a substantially vertical disposition. The top wall 55 can also be demarcated from the sidewall(s) 56 by being constructed of respective parts and/or being separated by a particular feature of the lawnmower 30, such as a distinct bend or ridge in the cutter housing. The top wall 55 can be integrally formed with the sidewall(s) 56, but can also be a separate structure that is attached to the sidewall(s) 56. The top wall 55 and the sidewall(s) 56 can define the multiple cutting chambers 48 of a particular cutter housing 37, such as the first cutting chamber 53 and the second cutting chamber 54 shown in FIG. 4. The top wall 55 and the sidewall(s) 56 can also be integrally formed of stamped or cast metal or of molded plastic construction.

The cutter housing 37 shown in FIG. 4 can include a rear discharge layout. That is, a discharge opening 47 can be provided in the cutter housing 37. In operation, lawn clippings can be ejected from the first cutting chamber 53 and/or the second cutting chamber 54 through the discharge opening 47 and into a passageway that communicates with the collection bag 46. Accordingly, lawn clippings can be ejected from the cutting chambers 48, including the first cutting chamber 53 and the second cutting chamber 54, and passed to the collection bag. The collection bag 46 can then be emptied at a point in time as may be desired. The collection bag 46 can be emptied when the operator of the lawnmower 30 determines that the collection bag 46 is full, for example. It is appreciated that the size and particular positioning of the discharge opening 47 can be varied as may be desired.

Figure 5:
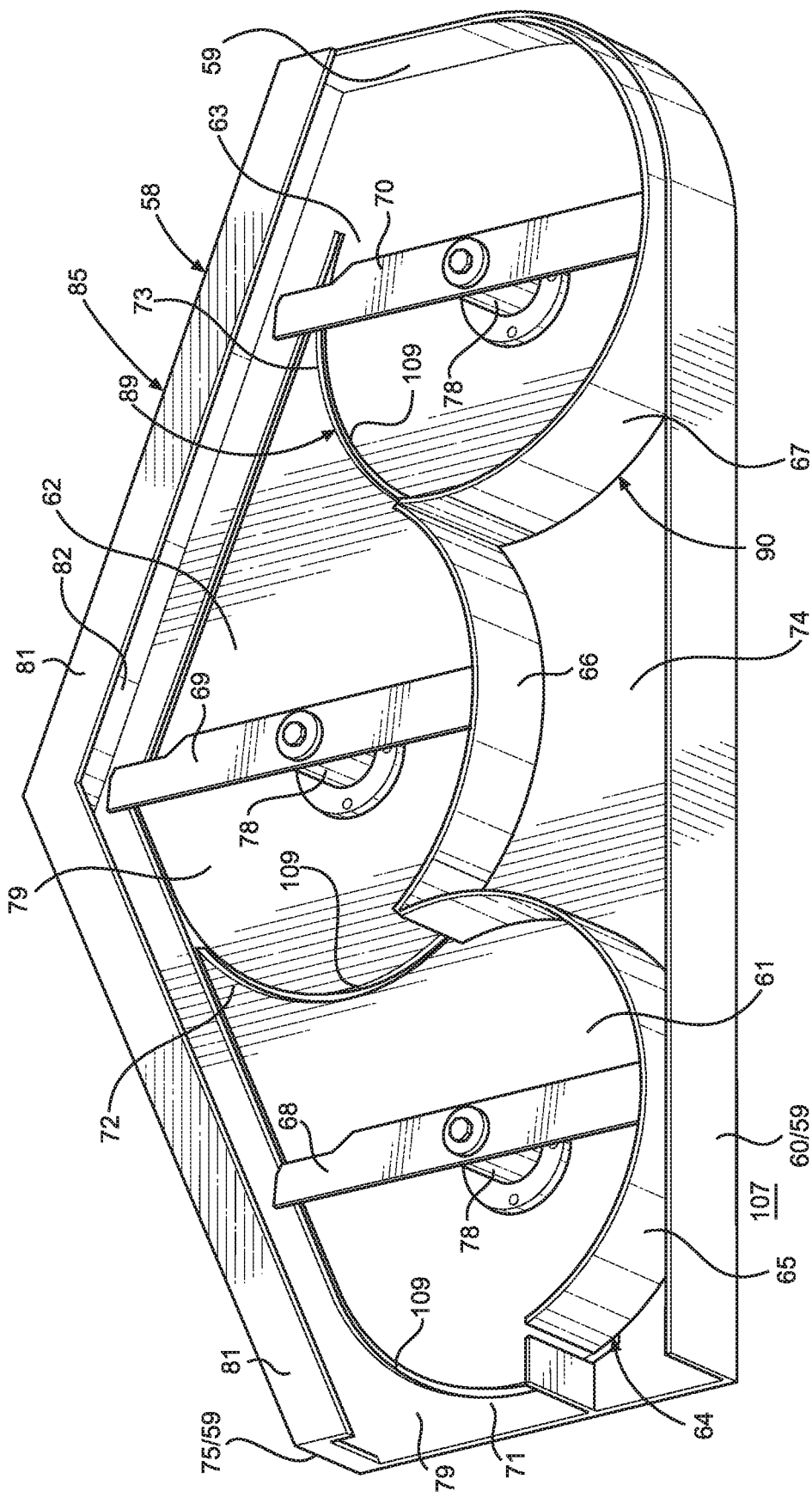
FIG. 5 is a schematic perspective bottom view of a cutter housing assembly, with conversion assembly in a discharge position, made in accordance with principles of the disclosed subject matter.

FIG. 5 is a bottom view of a further cutter housing 58, which is part of cutter housing assembly 85. The cutter housing 58 includes a first cutting chamber 61, a second cutting chamber 62, and a third cutting chamber 63. The cutting chambers 61, 62, 63 can be demarcated or defined by side walls 59 and/or chamber walls 64. The sidewalls 59 can include a rear side wall 60 and a front wall 75, as well as a top wall 74. The top wall 74 can include an underside 79. The chamber walls 64 can include a first chamber wall 65, a second chamber wall 66, and a third chamber wall 67. The first chamber wall 65 can serve to demarcate, at least in part, the first cutting chamber 61. The second chamber wall 66 can serve to demarcate, at least in part, the second cutting chamber 62. The third chamber wall 67 can serve to demarcate, at least in part, the third cutting chamber 63.

Each of the cutting chambers 61, 62, 63 can be provided with a respective rotating blade 68, 69, 70. The rotating blades can include a first blade 68, a second blade 69, and a third blade 70. Each of the rotating blades can be supported by a driven shaft 77 with associated pulley. The driven shaft 77 can be pivotably supported by a bearing housing 78 that is provided in the top wall 74 of the cutter housing 58. Each of the driven shafts can be mechanically powered by the prime mover of the particular lawnmower, in conjunction with a mechanical power transfer arrangement, such as a pulley(s) and belt arrangement as described above.

The cutter housing 58 can include a front wall 75, as described above, as well as a front lower flange 81. The front lower flange 81 can extend along a front extent of the cutter housing 58. The front lower flange 81, front wall 75, and top wall 74 can collectively form a flow channel 82. When in discharge mode, vegetation clippings can be transported along the flow channel 82, by airflow within the flow channel 82, and exit the cutter housing 58 through a first discharge opening 71.

The cutter housing 58 of FIG. 5 is provided, as illustrated, with a side discharge layout. The side discharge layout can include the discharge opening 71 on the left-hand side as shown in FIG. 5 with the cutter housing upside down. From a bottom view, as shown in FIG. 5, the blades 68, 69, 70 can spin in a counterclockwise manner. As a result, lawn clippings can be propelled, due to the airflow within the cutter housing 58, along the front of the cutter housing 58 and towards the discharge opening 71.

The cutter housing 58 of FIG. 5 illustrates an asynchronous cutter housing layout of a mower deck. In such arrangement, the center blade 69 can be positioned, in a longitudinal direction of the lawnmower, in front of both of the side blades 68, 70. Thus, in the arrangement there may be "cross-over" of the center blade 69 with one or more of adjacent blades 68, 70 along a drive path axis (longitudinal axis) of the lawnmower. However, because the center blade 69 is positioned in front of the adjacent blades 68, 70 the blades do not interfere with each other during rotation. Accordingly, in such an arrangement it may not be needed to time or synchronize the blades relative to each other.

As described above, a lawnmower of the disclosure can include a cutter housing lift assembly that controls height of the cutter housing or deck. The height of the cutter housing 58 can be controlled so as to be positioned between a raised position and a lowered position, as well as positioned in interim positions between the raised position and the lowered position. The height of the cutter housing 58 can be controlled by a lever that is manipulated by the operator of the particular lawnmower.

Figure 6:
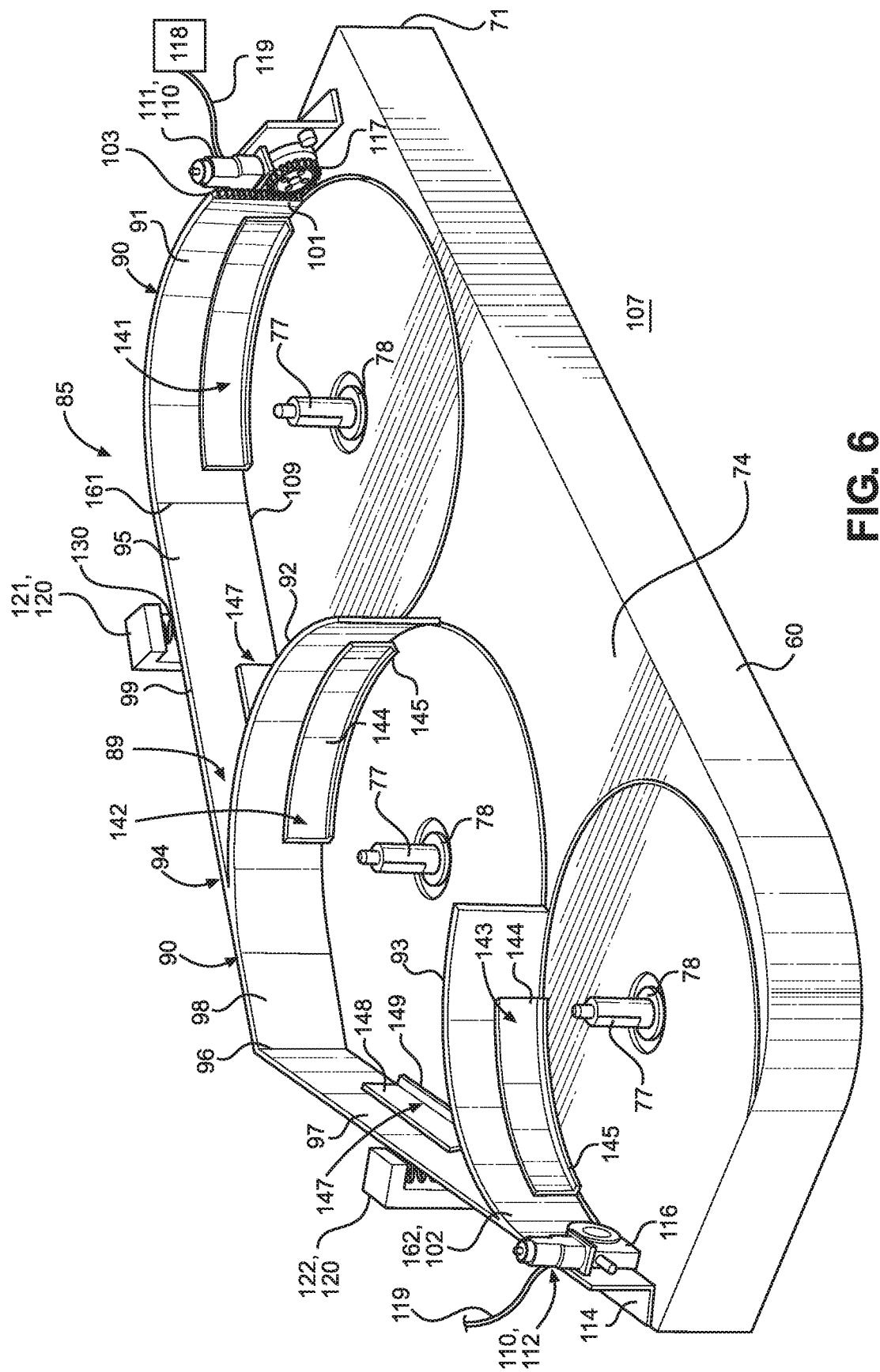
FIG. 6 is a schematic perspective top view of the cutter housing assembly of FIG. 5, with conversion assembly in the discharge position.

FIG. 5 further shows conversion assembly 89 of the cutter housing assembly 85, made in accordance with principles of the disclosed subject matter. As described above, the cutter housing or mower deck 58 can include one or more cutting chambers. In accordance with the disclosed subject matter, the cutter housing 58 can include dual configurations to provide both a discharge option and a mulching option that can be controllable by a user or operator of the lawnmower via a controller on a control panel of the lawnmower. The conversion assembly 89 can include an adjustable wall assembly 90. Position of the adjustable wall assembly 90 can control whether the lawnmower is in mulch mode or discharge mode. The cutter housing 58 can be equipped with the adjustable wall assembly 90 on the cutter housing 58, as shown in FIG. 6, for example. The adjustable wall assembly 90 can be in the form of and/or include one or more walls, i.e., a first adjustable chamber wall 91, a second adjustable chamber wall 92, and a third adjustable chamber wall 93, which can be characterized as gates or doors. The one or more walls 91, 92, 93 can include steel or other material construction. Hereinafter, the cutter housing assembly 85 of the disclosure will be described in further detail.

The cutter housing assembly 85 can include the cutter housing 58 and the conversion assembly 89. The cutter housing 58 can include, as described above, a first cutting chamber 61 with a first chamber wall 65. The first chamber wall 65 can be provided with the first discharge opening 71. The cutter housing 58 can also include a slot arrangement 109. The slot arrangement 109 can include a plurality of slots in the top wall 74 of the cutter housing. The slot arrangement can slidably receive the adjustable wall assembly 90 so as to allow movement of the adjustable wall assembly 90 within the slot arrangement 109. Such movement provides conversion between full mulch mode and full discharge mode, as well as interim positions, as may be desired. The movement can be vertical and substantially parallel with the rotational axis of the blades 68, 69, 70.

Figure 7:
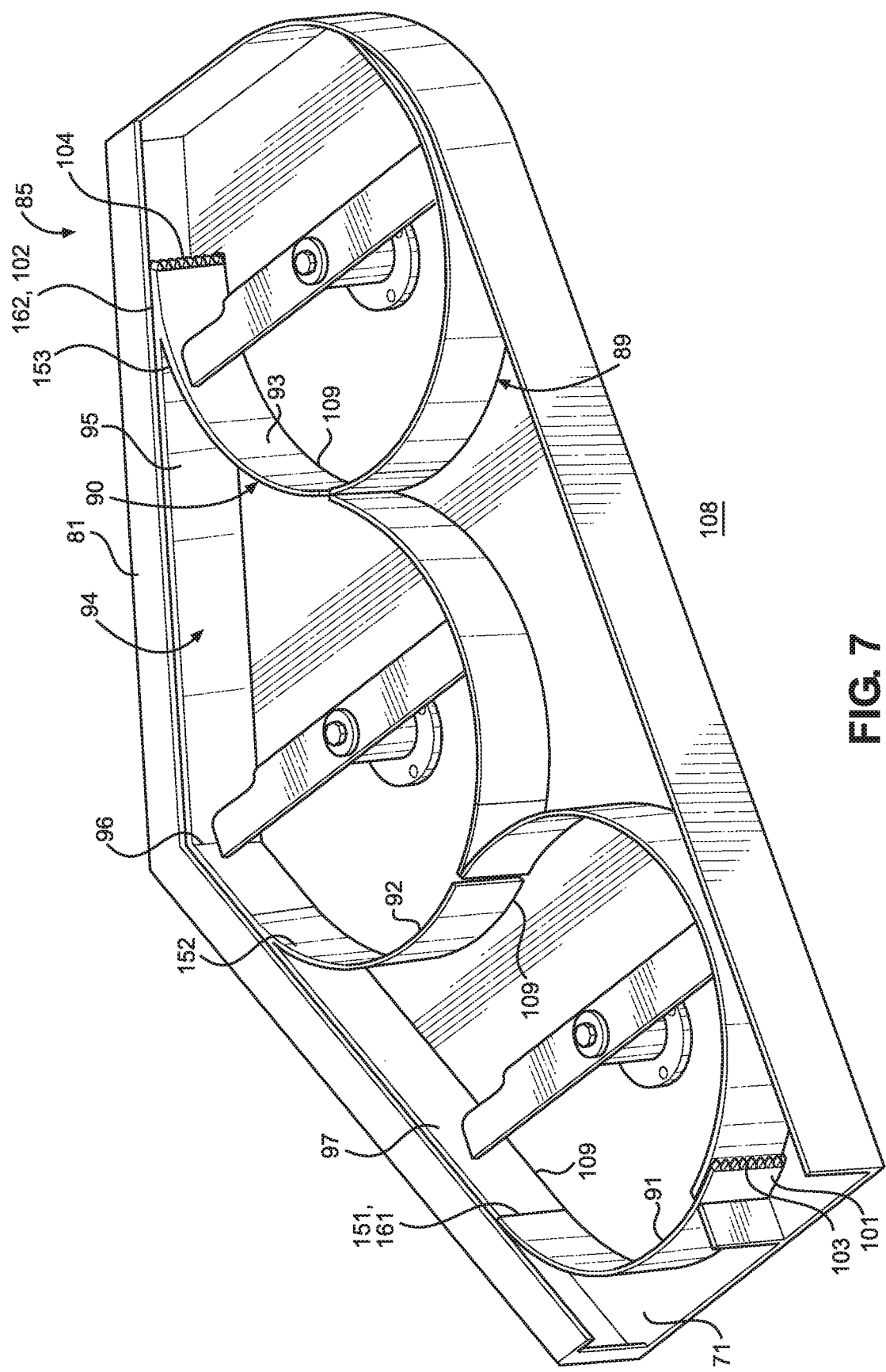
FIG. 7 is a schematic perspective bottom view of the cutter housing assembly of FIG. 5, with conversion assembly in the mulch position.
Figure 8:
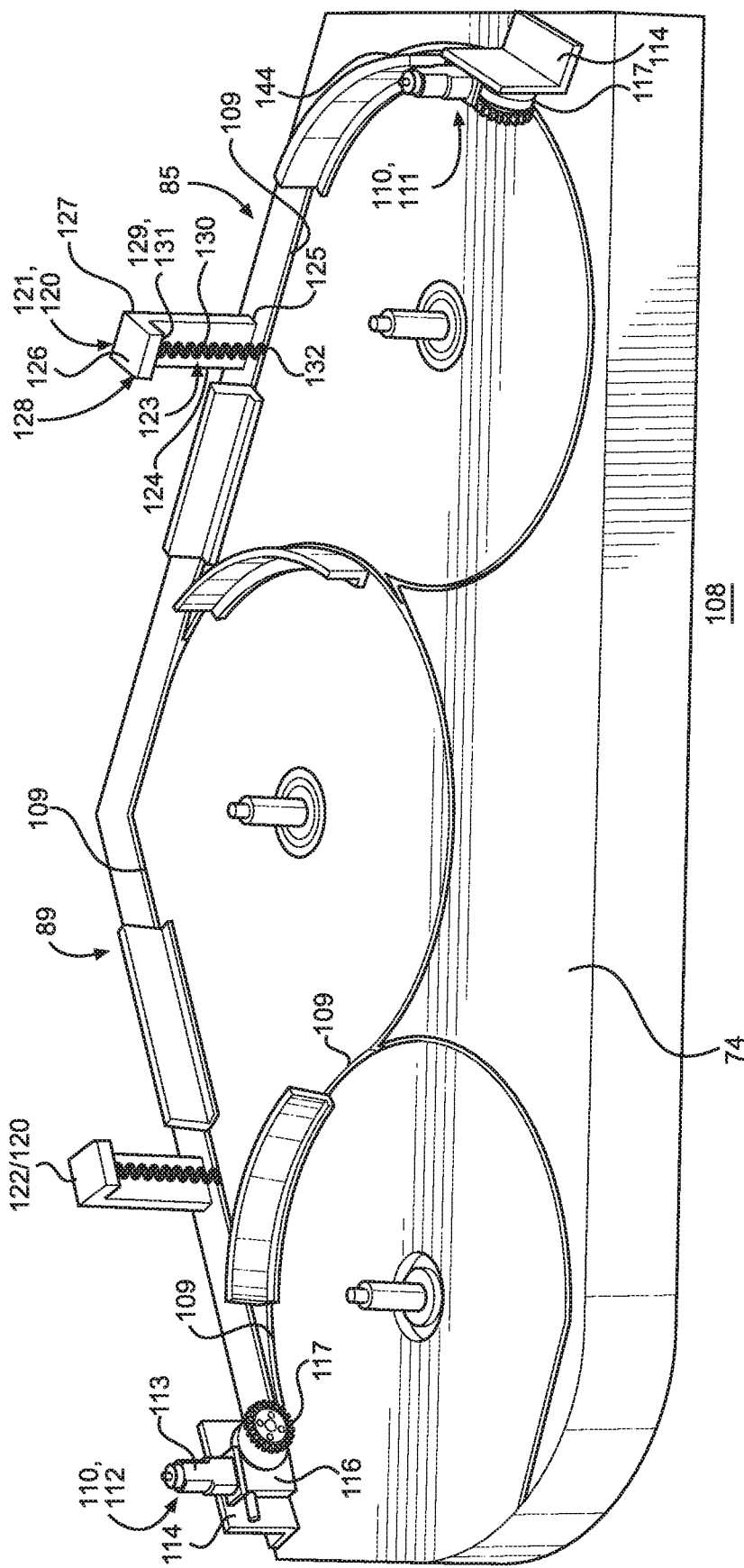
FIG. 8 is a schematic perspective top view of the cutter housing assembly of FIG. 5, with conversion assembly in the mulch position.
Figure 10:
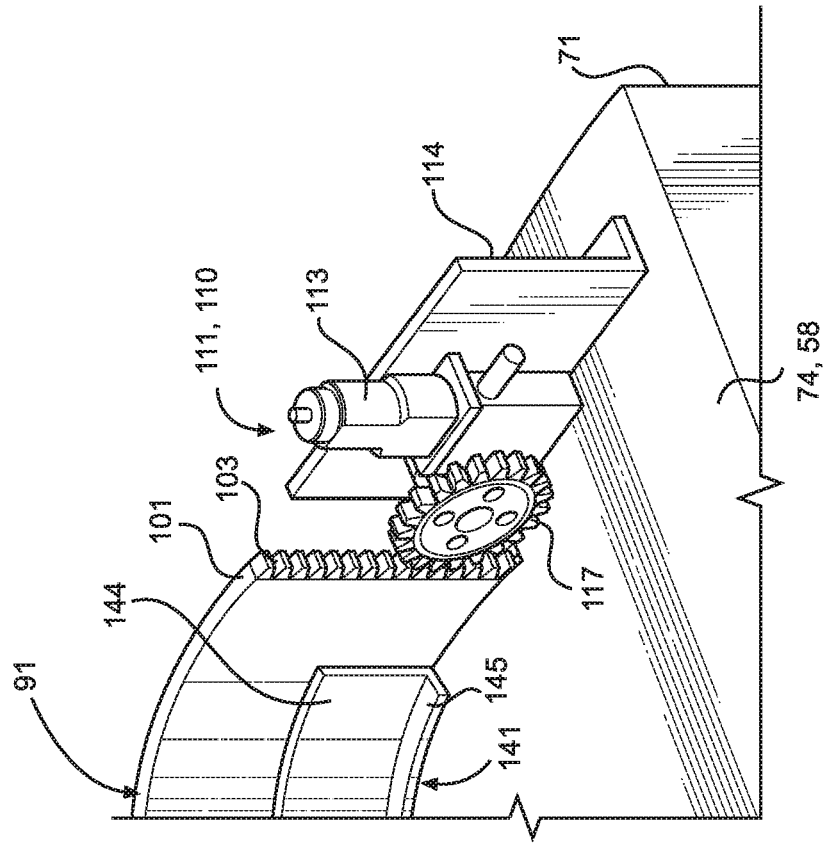
FIG. 10 is a partial perspective schematic view of a conversion assembly, with adjustable wall assembly open, made in accordance with principles of the disclosed subject matter.

The conversion assembly 89 can be provided on the cutter housing 58. The conversion assembly 89 can include the adjustable wall assembly 90 and a height adjustment actuator 110. The adjustable wall assembly 90 can be slidably or movably attached to the cutter housing 58 so as to be selectively vertically movable, within the slot arrangement 109, between an opened position 107 (as shown in FIGS. 5 and 6) and a closed position 108 (as shown in FIGS. 7 and 8). In the opened position 107, the adjustable wall assembly 90 can be positioned so that the first discharge opening 71, of the first chamber wall 65, is opened to provide a discharge mode. In the closed position 108, the adjustable wall assembly 90 can be positioned so that the adjustable chamber wall 91 closes the first discharge opening 71 to provide a mulch mode.

The height adjustment actuator 110 can be mounted on the cutter housing and operatively engage with the adjustable wall assembly 90. The height adjustment actuator 110 can operatively engage with the adjustable wall assembly 90 so as to move the adjustable wall assembly 90 between the opened position 107 and the closed position 108. The height adjustment actuator can be controllable by a user so as to effect such movement of the adjustable wall assembly 90 between the opened position 107 and the closed position 108.

As described above, the adjustable wall assembly 90 can include the first adjustable chamber wall 91. The first adjustable chamber wall 91 can be the portion of the adjustable wall assembly 90 that serves or provides closure to the first discharge opening 71, i.e. when the adjustable wall assembly 90 is in the closed position 108.

The cutter housing 58 can also include a second cutting chamber 62 with a second chamber wall 66 that is provided with a second discharge opening 72. Relatedly, the adjustable wall assembly 90 can further include a second adjustable wall, door or gate 92. The second adjustable chamber wall 92 can be positioned so that the second discharge opening 72 is opened when the adjustable wall assembly 90 is in the opened position. The second adjustable chamber wall 92 can be positioned so that the second discharge opening 72 is closed when the adjustable wall assembly 90 is in the closed position.

The cutter housing 58 can also include a third cutting chamber 63 with a third chamber wall 67 that is provided with a third discharge opening 73. Relatedly, the adjustable wall assembly 90 can further include a third adjustable wall, door or gate 93. The third adjustable chamber wall 93 can be positioned so that the third discharge opening 73 is opened when the adjustable wall assembly 90 is in the opened position. The third adjustable wall 93 can be positioned so that the third discharge opening 73 is closed when the adjustable wall 90 is in the closed position.

The adjustable wall 90 can include structure to connect the first, second and third adjustable walls 91, 92, 93. Such connecting structure can include a connection flange 94. The connection flange 94 can include a first flange portion 95 and a second flange portion 97. The first flange portion 95 can be connected to the second flange portion 97 at a flange junction 96. The first flange portion 95 and the second flange portion 97 can be straight. The flange junction 96 can connect the flange portions 95, 97 at an angle, as shown in FIG. 6, for example, of approximately 30-50 degrees, in accordance with an embodiment of the disclosed subject matter, and can correspond to a front angle and/or shape of the front wall 75 of the cutter housing 58. The first flange portion 95 can be connected to and support both first adjustable chamber wall 91 and the second adjustable chamber wall 92. The second flange portion 97 can be connected to and support the third adjustable chamber wall 93. A connection end 151 of the first adjustable chamber wall 91 can be connected to an end 161 of the first flange portion 95.

A connection end 153 of the third adjustable chamber wall 93 can be connected to an end 162 of the second flange portion 97. The second adjustable chamber wall 92, at a connection end 152 thereof, can be connected to the first flange portion 95 at an interim position along a length of the first flange portion 95 at a connection point 100. The connection point 100 can demarcate in the first flange portion 95 a center segment 98 and an outer segment 99. The connection flange 94 can be similar in construction to the adjustable chamber walls 91, 92, and 92, such as with regard to material, thickness, and height, for example.

The adjustable walls 91, 92 and 93 can be integrally formed with the connection flange 94 and/or be mechanically fastened to the connection flange 94, such as by welding or bolts, for example. The flange is an optional component. The first flange portion 95 can be integrally formed with the second flange portion 97 with such two portions demarcated by the flange junction 96. The first adjustable chamber wall 91 can extend from end 161 and be integrally formed with the first flange portion 95. Demarcation between the first flange portion 95 and the first adjustable chamber wall 91 can be provided by the first adjustable chamber wall 91 being curved and the first flange portion 95 being straight. The third adjustable chamber wall 93 can extend from end 162 and be integrally formed with the second flange portion 97. The junction of the first flange portion 95 and the first adjustable chamber wall 91 can include a smooth transition. The junction of the second flange portion 97 and the third adjustable chamber wall 93 can be in the form of a point or acute angle, i.e. such point of attachment corresponding to both the connection end 153, of wall 93, and end 162 of connection flange 94. It is appreciated that components of the adjustable wall assembly 90 that are integrally formed can be reinforced by mechanical fastener and/or welding. The second adjustable chamber wall 92 can be welded to the first flange portion 95 at the connection point 100.

The adjustable wall assembly 90 can include a first end 101 and a second end 102. The first end 101 can correspond to an outboard end of the first adjustable chamber wall 91 (opposite to connection end 151). The second end 102 can correspond to both connection end 153 (of the third adjustable chamber wall 93) and end 162 of the connection flange 94. The first and second ends 101, 102 can be provided with structure that interfaces or engages with a height adjustment actuator 110 so as to control vertical movement of the adjustable wall assembly 90. For example, the first end 101 can be provided with a first gear rack 103. The second end 102 can be provided with a second gear rack 104. The gear racks 103, 104 can each be a linear gear so as to constitute part of a "rack and pinion" gear arrangement. Other known gear and driver assemblies can be used, such as a belt pulley system, worm gear, or other known gear, stepper motors, or other known movement devices.

The height adjustment actuator 110, of the conversion assembly 89, can include a first height adjustment mechanism 111 and a second height adjustment mechanism 112, which can be of the same or similar structure.

Illustratively, with reference to the height adjustment mechanism 111, such height adjustment mechanism 111 can include at least one pinion gear 117. The pinion gear 117 can rotatably engage with the first gear rack 103. In particular, the pinion gear 117 can rotatably engage with the first gear rack 103 to move the adjustable wall assembly 90 between the opened position 107 and the closed position 108. The pinion gear 117 can be operatively connected to a power mechanism. The power mechanism can include electric motor 113 (or other known motors, such as pneumatic, hydraulic, magnetic, or even an internal combustion engine motor, especially if a power take-off is available from the motor transmission). The power mechanism 113 and gear assembly 116 can be connected to the cutter housing 58 using a motor mount bracket 114 or other bracket, flange, or other attachment arrangement. Pinion gear 117 can be part of or operatively connected to a gear assembly 116. In turn, the gear assembly 116 can be operatively connected to the electric motor or other power mechanism 113. Alternatively, the electric motor 113 could be directly connected to the pinion gear. Accordingly, the rack and pinion arrangement of the first gear rack 103 and the pinion gear 117 can translate the rotary motion of the electric motor 113 into linear motion, and specifically vertical linear motion, so as to raise and lower the adjustable wall assembly 90.

As described above, the second height adjustment mechanism 112 can be of similar structure to the first height adjustment mechanism 111. A pinion gear 117 of the second height adjustment mechanism 112 can operatively engage with the second gear rack 104. Operation of the second height adjustment mechanism 112 can be the same or similar to operation of the first height adjustment mechanism 111. Accordingly, both the first end 101 and the second end 102 of the adjustable wall assembly 90 can be supported for movement between opened position 107 and closed position 108, as well as interim positions as may be desired. Such interim positions can provide partial mulching/partial discharge.

The height adjustment actuator 110, including the first height adjustment mechanism 111 and the second height adjustment 112, can be controlled using controller 118. The first height adjustment mechanism 111 and the second height adjustment 112 can be controlled so as to operate in unison. Relatedly, sensors, providing "feedback" can be used so as to monitor rotation of the pinion gears and/or monitor position of the opposing ends of the adjustable wall assembly 90, i.e. so as to raise or lower the two ends in unison. Control wires 119 can connect the height adjustment actuator 110 to the controller 118. The controller 118 can be connected to a suitable power source, such as a battery on the lawnmower, and/or control power to the height adjustment actuator 110. For example, the controller 118 can include buttons on a control surface of the lawnmower. Such buttons can respectively control whether electrical power is provided to the height adjustment actuator 110 and the direction of such electrical power so as to control whether the adjustable wall assembly 90 is raised or lowered. Other electrical components can be utilized to control power to the height adjustment actuator 110 and/or the positive-negative direction of such power provided to the height adjustment actuator 110. The disclosed arrangement is not limited to the particulars of the pinion gear 117, mating gear rack (collectively a rack and pinion arrangement), and electric motor 113. For example, instead of the electric motor 113, a manual hand-crank with ratchet or lever could be utilized so as to rotate pinion gear 117. Additionally, instead of the rack and pinion arrangement, a lever(s) arrangement could be utilized so as to vertically adjust the position of the adjustable wall assembly.

It is appreciated that the weight of the adjustable wall assembly 90 may be difficult or burdensome for the first height adjustment mechanism 111 and the second height adjustment mechanism 112 to support. Accordingly, the conversion assembly 89 can include a lift assembly 120 and a guide assembly 140. The lift assembly 120 can support a portion of the weight of the adjustable wall assembly 90 and, as a result, can provide more stable and controlled operation of the conversion assembly 89. The guide assembly 140 can guide the adjustable wall assembly 90 in moving between the opened position 107 and the closed position 108.

The lift assembly 120 can include a first tower 121 and a second tower 122. In another embodiment a single tower can be provided. In the arrangement of FIG. 6, for example, the height adjustment mechanisms 111, 112 in conjunction with the towers 121, 122 can provide, collectively, four points of connection and support to the adjustable wall assembly 90. Such arrangement can afford stable and controlled operation of the conversion assembly 89. However, in other embodiments, different numbers of height adjustment mechanisms and/or lift assemblies and/or guide assemblies 140 can be utilized.

The first tower 121 and the second tower 122 can be of same or similar structure to provide a lifting force on the adjustable wall assembly 90. The first tower 121 can include a tower body 123 in the form of an L-shape that includes a vertical portion 124 and a horizontal portion 126. The vertical portion 124 can include a first end 125 that can be welded or otherwise attached to the cutter housing 58. The first end 125 can be a lower end of the vertical portion 124. The vertical portion 124 can be demarcated relative to the horizontal portion 126 by a bend 127. An upper portion of the vertical portion 124 and/or the horizontal portion 126 can include or correspond to an upper portion 128. For example, the horizontal portion 126 can correspond to the upper portion 128.

The upper portion 128 can include a tower spring attachment element 129. For example, the tower spring attachment element 129 can be a hook, clavicle, eyelet, or other mechanical structure that can attach to a spring 130. The spring 130 can be attached at a first end 131 to the tower spring attachment element 129. The spring 130 can also include a second end 132. The second end 132 of the spring 130 can be attached to the adjustable wall 90. Specifically, the second end 132 of the spring 130 can be attached to a wall spring attachment element 135 of the adjustable wall assembly 90. The wall spring attachment element 135 can be a hook, clavicle, eyelet, or other mechanical structure that can attach to the second end 132 of the spring 130. Each wall spring attachment element 135 can be attached to the connection flange 94 at a location beneath or underneath the particular tower 121, 122, as illustrated in FIG. 6. The wall spring attachment element 135 can be provided at or adjacent an upper edge of the connection flange 94. It is also appreciated that additional towers, similar in structure to tower 121 or 122, can be associated with the adjustable chamber walls 91, 92, 93. That is, such adjustable chamber walls 91, 92, 93 can be attached to springs, or other lift devices, so as to further balance or differently balance lift load. It may be desirable to effectively balance lift of the adjustable wall assembly 90 so as to ensure a controlled and stable lift of the adjustable wall assembly 90 and so as to prevent "binding" as the adjustable wall assembly 90 is moved from the opened position 107 to the closed position 108.

Accordingly, a spring 130, for each of the first tower 121 and a second tower 122, can provide lift to the adjustable wall assembly 90 so as to assist the height adjustment actuator 110. The amount of tension of the springs 130, length of the springs 130, number of the springs and other mechanical attributes of the springs 130, can be varied as desired and per application. It should be appreciated that as the adjustable wall assembly 90 is lowered, tension of the springs 130 can increase. Such increase in tension of the springs serves to provide a buoyant or lift force to the adjustable wall assembly 90. The springs 130 can be in tension in the opened position 107, i.e., in a raised position of the adjustable wall assembly 90, albeit less than tension provided in the lowered or close position 108. Extension of the spring when the adjustable wall assembly 90 is in the opened position 107 and extension of the spring when the adjustable wall assembly 90 is in the closed position 108 can correspond to a suitable working length or range of the particular spring(s) that is utilized. One or more springs can be utilized or associated with a particular tower 121 or 122. Additional towers with associated springs can be included.

It is appreciated that the lift assembly 120 is not limited to the particular use of springs. Other mechanical arrangements may be utilized such as hydraulic or pneumatic arrangements to assist in lifting of the adjustable wall assembly 90.

As described above, the conversion assembly 89 can also include one or more wall brackets, which can include a first wall bracket 141 and a second wall bracket 142. The first wall bracket 141 can be attached to the cutter housing, along a portion or segment of the slot arrangement 109, and engageable with the first adjustable chamber wall 91 to guide such wall 91 between the open position and the closed position, i.e. during raising or lowering of the adjustable wall assembly 90. The second wall bracket 142 can be attached to the cutter housing, along a portion or segment of the slot arrangement 109, and engageable with the second adjustable chamber wall 92 to guide such wall 92 between the opened position and the closed position. Additionally, a third wall bracket 143 can be attached to the cutter housing, along a portion or segment of the slot arrangement 109, and engageable with the third adjustable chamber wall 93 to guide such wall 93 between the opened position and the closed position of the adjustable wall assembly 90.

Each of the wall brackets 141, 142, 143 can include a support flange, i.e. a guide flange or portion, 144 and a connection flange 145. The support flange 144 can include a vertical plate that is curved or arcuate. Such curved or arcuate shape can be provided to match with the particular shape of the particular associated adjustable chamber wall, 91, 92, 93. Relatedly, it is appreciated that the adjustable chamber walls 91, 92, 93 need not be of the same shape. For example, the curvature or length of such walls 91, 92, 93 may differ from each other, and can be circular to form a portion of a cylinder or can be ellipsoidal to form an ellipsoidal cylinder structure. The support flange 144 can vary in height, width, thickness, material, and in other attributes. Each of the support flanges 144 can be constructed to effectively guide and stabilize the adjustable wall assembly 90 as the adjustable wall assembly 90 is raised or lowered. Each of the support flanges 144 can be located along or proximate to a portion or segment of the slot arrangement 109. The connection flange 145, of each of the wall brackets 141, 142, 143, can be at right angles to the associated support flange 144. Each of the connection flanges 145 can be welded or otherwise attached to the cutter housing 58.

In accordance with some embodiments of the disclosure, the guide assembly 140 can include a wall bracket to support and guide each of the respective adjustable chamber walls of the adjustable wall assembly 90. In other embodiments, only some of the adjustable walls can be provided with a wall bracket. For example, the outboard adjustable chamber walls 91, 93 can be provided with a wall bracket, for guiding, whereas the central adjustable chamber wall 92 is not provided with a bracket. Additionally, a wall bracket can be provided on both sides of a particular adjustable chamber wall 91, 92, 93 and/or both sides of the connection flanges 94.

Additionally, the conversion assembly 89 can include one or more flange brackets, which can include a first flange bracket 146 and a second flange bracket 147. The first flange bracket 146 can be attached to the cutter housing, along a portion or segment of the slot arrangement 109, and engageable with the connection flange 94. Similarly, the second flange bracket 147 can be attached to the cutter housing, along a portion or segment of the slot arrangement 109, and engageable with the connection flange 94. Such flange brackets 146, 147 can be engageable with the connection flange 94 so as to guide the adjustable wall assembly 90 when raising or lowering the adjustable wall assembly 90. As shown in FIG. 6, each of the flange brackets 146, 147 can include a support flange 148 and a connection flange 149. The support flange 148 can include a vertical plate that is straight so as to match the shape of the connection flange 94. The connection flange 149 can be at right angles to the support flange 148. The connection flange 149 can be welded or otherwise attached to the cutter housing 58. One or more first flange brackets 146 can be provided on the same or opposing sides of the first flange portion 95. One or more second flange brackets 147 can be provided on the same or opposing sides of the second flange portion 97. As with the wall brackets 141, 142, 143, the position, size, shape, height, width, thickness and other attributes of the flange brackets can vary as desired.

Figure 9:
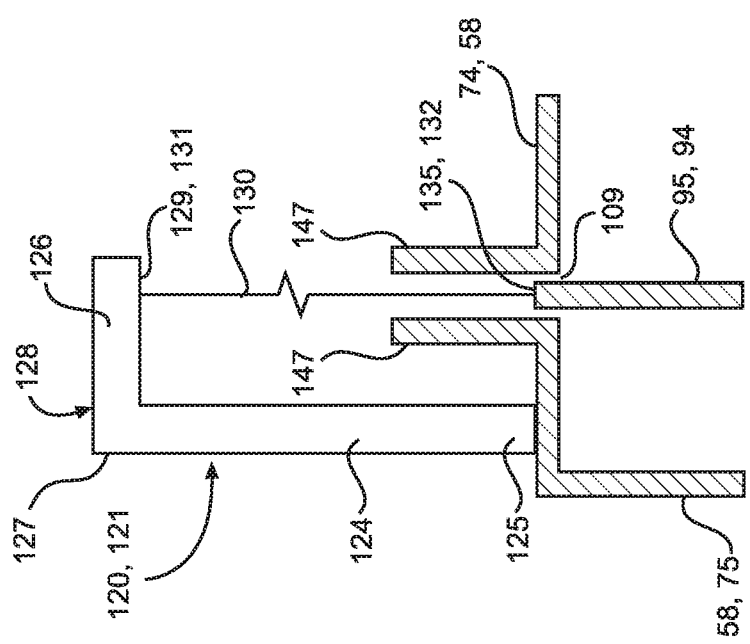
FIG. 9 is a partial cross-sectional schematic view of a cutter housing assembly, with cutter housing, adjustable wall assembly and guide assembly, made in accordance with principles of the disclosed subject matter.

As illustratively shown in FIG. 9, the guide assembly 140 can include two flange brackets 147 positioned on opposing sides of the slot arrangement 109. Additionally, in the arrangement of FIG. 9, each of the flange brackets 147 can be integrally formed with a top wall 74 of the cutter housing 58. Each of the flange brackets 147 can be formed of steel plate and welded to the top wall 74 of the cutter housing 58. The position, size, and other attributes of the wall brackets 141, 142, 143 and flange brackets 146, 147 can vary depending on the particular shape of the cutter housing 58, the number of cutting chambers, and other attributes of the particular lawnmower.

As described above, the cutter housing 58 can include a front lower flange 81 as shown in FIG. 5 and FIG. 7. The front lower flange 81 can act as a "stop" to limit downward vertical movement of the adjustable wall assembly 90. That is, at a lower extent of travel of the adjustable wall assembly 90 up and down, the adjustable wall assembly 90 can abut or lower onto the front lower flange 81, such that additional downward movement of the adjustable wall assembly 90 is prevented and the wall 90 is supported in the closed position. Other stops and/or constraints may be utilized so as to limit travel of the adjustable wall assembly 90 up and down.

It is appreciated that the various components of embodiments of the disclosure can be made from any of a variety of materials including, for example, metal, plastic, plastic resin, nylon, composite material, and/or rubber, for example, or any other material as may be desired.

A variety of production techniques can be used to make the apparatuses as described herein. For example, suitable casting and/or injection molding and other molding techniques, extrusion and other manufacturing techniques might be utilized. Also, metal stamping or cutting can be utilized. For example, metal stamping or cutting can be utilized in construction of the cutter housing 58, the adjustable wall assembly 90, the various components of the guide assembly 140, as well as various other components described herein.

While the subject matter has been described in detail with reference to exemplary embodiments thereof, it will be apparent to one skilled in the art that various changes can be made, and equivalents employed, without departing from the scope of the disclosure.

For example, although the adjustable wall assembly 90 has been described as having an opened position 107 and a closed position 108, as otherwise described herein, the adjustable wall assembly 90 can include one or more intermediate positions between the opened position and a closed position. In such intermediate positions, the adjustable wall assembly 90 can partially block the one or more discharge openings of the particular cutter housing. As a result, a partial mulch mode can be attained, or in other words a partial discharge mode can be attained in which each intermediate position(s) can provide a corresponding amount of mulched vegetation and discharged vegetation.

The conversion assembly 89 has been described in use with a cutter housing having three cutting chambers. However, a conversion assembly 89 of the disclosure can be provided with a cutter housing having other number of cutting chambers, such as a single cutting chamber, two cutting chambers, or four cutting chambers, for example. Additionally, the conversion assembly 89 of the disclosure can be used with a wide variety of types of lawnmower including a walk behind mower, self-propelled mower, tractor type, other ride-on type, or other type of lawnmower.

In addition, first, second and third adjustable walls 91-93 can all be formed together as a single continuous unitary wall 90 with two actuators 110 on either end of the single continuous unitary wall 90. However, the first, second and third adjustable walls 91-93 can also be individual walls that each include a set of actuators 110. Further, each adjustable wall can be broken down into a set of segmented walls that make up each adjustable wall with each of the segments moveable within a respective slot of a plurality of slots (or a single slot) 109 located in the cutter housing 58.

In addition, embodiments are disclosed above in which components of the cutter housing assembly, such as components of the guide assembly 140, are constructed of a single or unitary piece. However, embodiments are intended to include or otherwise cover components that include or are constructed of multiple pieces. For example, multiple pieces of the first wall bracket 141, or the other components of the guide assembly 140, can be separately stamped from metal and then connected together such as but not limited to welding, adhesive or mechanical fasteners, for example.

Embodiments are disclosed above in which the cutter housing 58, the cutting chambers, the adjustable wall assembly 90, and the connection flange 94 include a specific shape, geometry, or construction. It is appreciated that shape and structure of components described herein may vary between different types of lawnmowers and different types of cutter housings. Accordingly, exemplary embodiments are also intended to include or otherwise cover assemblies that include variations in shape, geometry, or construction as dependent on assemblies and lawnmowers with which the shutter assembly is intended to be utilized.

What is claimed is:

1. A cutter housing assembly for a lawnmower comprising:
    a cutter housing that includes:
        a first cutting chamber with a first chamber wall including a first discharge opening;
        a second cutting chamber with a second chamber wall including a second discharge opening spaced away from the first discharge opening;

a third cutting chamber with a third chamber wall including a third discharge opening spaced away from each of the first discharge opening and the second discharge opening, the second cutting chamber is located between the first cutting chamber and the second cutting chamber; and
a slot arrangement located in the cutter housing;
a conversion assembly that includes:
an adjustable wall slidably attached to the cutter housing so as to be selectively movable, within the slot arrangement, between (a) an opened position in which the adjustable wall is positioned so that both of the first discharge opening and the second discharge opening are opened to provide a discharge mode, and (b) a closed position in which the adjustable wall is positioned so that the adjustable wall closes both of the first discharge opening and the second discharge opening to provide a mulch mode, the adjustable wall extends uninterrupted from the first cutting chamber to the third cutting chamber; and
a height adjustment actuator located on the cutter housing and operatively engaged with the adjustable wall, and the height adjustment actuator controllable by a user to move the adjustable wall between the opened position and the closed position.

2. The cutter housing assembly of claim 1, wherein the adjustable wall includes,
a first adjustable wall that is vertically movable through the top wall within the slot arrangement and selectively opens and closes the first discharge opening when the adjustable wall assembly moves between the opened position and the closed position, respectively, and
a second adjustable wall that is spaced away from the first adjustable wall, the second adjustable wall is selectively vertically movable through the top wall within the slot arrangement and selectively opens and closes the second discharge opening when the adjustable wall moves between the opened position and the closed position, respectively.

3. The cutter housing assembly of claim 2, wherein the adjustable wall includes a third adjustable wall that is selectively vertically movable through the top wall within the slot arrangement and selectively opens and closes the third discharge opening when the adjustable wall assembly moves between the opened position and the closed position, respectively.

4. The cutter housing assembly of claim 3, wherein the adjustable wall includes a connection flange attached to each of the first adjustable wall, the second adjustable wall, and the third adjustable wall.

5. The cutter housing assembly of claim 4, wherein the connection flange includes a first flange portion and a second flange portion, and the first flange portion is connected to the second flange portion at an angle at a flange junction,
the third adjustable wall is spaced away from each of the first adjustable wall and the second adjustable wall,
the first flange portion extends from and is connected to and supports both the first adjustable wall and the second adjustable wall, and
the second flange portion extends from and is connected to and supports the third adjustable wall.

6. The cutter housing assembly of claim 1, further comprising:
a motor located on the cutter housing and including a blade attached to a blade shaft, the blade shaft having a rotational axis, and the slot is located in the cutter housing adjacent the motor, wherein
the adjustable wall is slidably attached within the slot arrangement such that the adjustable wall moves substantially parallel with the rotational axis between the closed position and the opened position.

7. The cutter housing assembly of claim 1, wherein the adjustable wall mates with both of the first chamber wall and the second chamber wall when the adjustable wall is in the closed position to form the first cutting chamber having a substantially continuous curved inner surface and to form the second cutting chamber having a substantially continuous curved inner surface.

8. The cutter housing assembly of claim 1, wherein
the adjustable wall includes at least one gear rack;
the height adjustment actuator includes at least one gear, and the at least one gear is in rotatable engagement with the at least one gear rack to move the adjustable wall between the opened position and the closed position; and
the gear is operatively connected to a power mechanism.

9. The cutter housing assembly of claim 8, wherein the height adjustment actuator is configured to move the adjustable wall to an interim position located between the opened position and the closed position such that the lawnmower is in a hybrid mode that is a partial mulch mode and partial discharge mode.

10. The cutter housing assembly of claim 1, wherein the height adjustment actuator includes a first height adjustment mechanism located at and connected to a first end of the adjustable wall and a second height adjustment mechanism located at and connected to a second end of the adjustable wall.

11. The cutter housing assembly of claim 2, wherein the conversion assembly further includes:
a first wall bracket attached to the cutter housing and engageable with the first adjustable wall to guide the first adjustable wall between the opened position and the closed position; and
a second wall bracket attached to the cutter housing and engageable with the second adjustable wall to guide the second adjustable wall between the opened position and the closed position.

12. The cutter housing assembly of claim 1, wherein the conversion assembly includes at least one tower that includes a first end and an upper portion, and the first end connected to the cutter housing and the upper portion connected to a spring at a first end of the spring, and a second end of the spring attached to the adjustable wall.

13. The cutter housing assembly of claim 8, wherein the conversion assembly includes at least one tower that includes a first end and an upper portion, and the first end connected to the cutter housing and the upper portion connected to a spring at a first end of the spring, and a second end of the spring attached to the adjustable wall.

14. The cutter housing assembly of claim 2, wherein the conversion assembly includes at least one tower that includes a first end and an upper portion, and the first end connected to the cutter housing and the upper portion connected to a spring at a first end of the spring, and a second end of the spring attached to the second adjustable wall.

15. The cutter housing assembly of claim 2, wherein:
the first chamber wall and the adjustable wall, when in the closed position, provide a continuous, curved interior surface to define the first cutting chamber; and the second chamber wall and the second adjustable wall, when in the closed position, provide a continuous, curved interior surface to define the second cutting chamber.

16. The cutter housing assembly of claim 2, wherein the adjustable wall is positionable, by the height adjustment actuator, at interim positions between the opened position and the closed position.

17. A cutter housing assembly for a lawnmower comprising:
a cutter housing that includes:
a first cutting chamber with a first chamber wall including a first discharge opening;
a second cutting chamber with a second chamber wall that includes a second discharge opening; and
a slot arrangement provided in the cutter housing;
a conversion assembly that includes:
an adjustable wall slidably attached to the cutter housing so as to be selectively vertically movable, within the slot arrangement, between (a) an opened position so that the first discharge opening is opened to provide a discharge mode, and (b) a closed position to close the first discharge opening to provide a mulch mode, the adjustable wall includes,
a first adjustable wall that is selectively vertically movable within the slot arrangement and positioned so that the first discharge opening is opened when the adjustable wall is in the opened position and positioned to close the first discharge opening when the adjustable wall is in the closed position,
a second adjustable wall that is selectively vertically movable within the slot arrangement and positioned so that the second discharge opening is opened and positioned to close the second discharge opening when the adjustable wall is in the closed position; and
a connection flange that extends from and is connected to each of the first adjustable wall and the second adjustable wall, the connection flange is vertically movable within the slot arrangement when the adjustable wall moves between the opened position and the closed position;
a height adjustment actuator located on the cutter housing and operatively engaged with the adjustable wall, and the height adjustment actuator controllable by a user for moving the adjustable wall between the opened position and the closed position;
a lift assembly attached to the cutter housing and attached directly to the connection flange, and the lift assembly configured to provide an upward bias force to the adjustable wall; and
a guide assembly that includes at least one bracket that guides the adjustable wall moving between the opened position and the closed position.

18. The cutter housing assembly of claim 17, wherein the adjustable wall includes,
a first end at which the first adjustable wall terminates and a second end at which the adjustable wall terminates, the second end is spaced away from each of the first adjustable wall and the second adjustable wall,
a first gear rack at the first end of the adjustable wall, and a second gear rack at the second end of the adjustable wall, and
the height adjustment actuator includes a motor that powers a first pinion gear engaged with the first gear rack, and a second motor that powers a second pinion gear engaged with the second gear rack.

19. A lawnmower comprising:
a cutter housing that includes,
a top wall,
a first chamber wall defining a first cutting chamber below the top wall, and a first discharge opening,
a second chamber wall defining a second cutting chamber below the top wall, and a second discharge opening,
a third chamber wall defining a third cutting chamber below the top wall, and a third discharge opening, and
a slot arrangement extending through the top wall and along each of the first chamber wall, the second chamber wall, and the third chamber wall; and
a conversion assembly that includes:
a first adjustable wall, a second adjustable wall spaced away from and connected to the first adjustable wall so as to move in unison with the first adjustable wall, and a third adjustable wall spaced away from and connected to the second adjustable wall so as to move in unison with the first adjustable wall and the second adjustable wall, the first, second and third adjustable walls are slidably attached to the cutter housing so as to be selectively movable as a single unit, within the slot arrangement, between (a) an opened position in which the first adjustable wall is positioned so that the first discharge opening is opened, the second adjustable wall is positioned so to that the second discharge opening is opened, and the third adjustable wall is positioned so that the third discharge opening is opened to provide a discharge mode, and (b) a closed position in which the first adjustable wall is positioned so that the first adjustable wall closes the first discharge opening, the second adjustable wall is positioned so that the second adjustable wall closes the second discharge opening, and the third adjustable wall is positioned so that the third adjustable wall closes the third discharge opening to provide a mulch mode; and
a height adjustment actuator located on the cutter housing and operatively engaged with the adjustable wall, and the height adjustment actuator controllable by a user to move the first, second, and third adjustable walls between the opened position and the closed position.

20. The lawnmower of claim 19, wherein
each of the first adjustable wall, the second adjustable wall and the third adjustable wall includes a top edge, and the top edges are spaced away from the top wall such that the top wall is located between the top edges and the first, second, and third cutting chambers.

* * * * *